Figure 1:
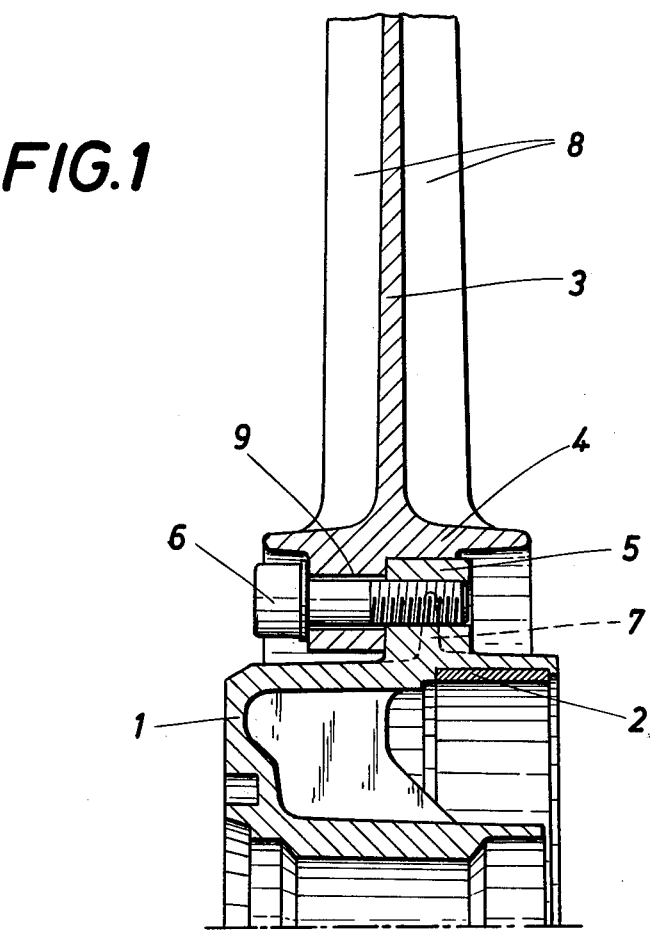

United States Patent [19]

Resele et al.

[11] 4,173,374
[45] Nov. 6, 1979

[54] ROAD WHEEL FOR MOTORCYCLES

[75] Inventors: Peter Resele; Herwig Leinfellner, both of Graz, Austria

[73] Assignee: Steyr-Daimler-Puch Aktiengesellschaft, Vienna, Austria

[21] Appl. No.: 897,575

[22] Filed: Apr. 19, 1978

[30] Foreign Application Priority Data

Jun. 13, 1977 [AT] Austria .................... 4134/77

[51] Int. Cl.² ........................................ B60B 1/00
[52] U.S. Cl. ............................ 301/6 CS; 301/9 DP; 301/80
[58] Field of Search ............... 301/6 LS, 6 W, 6 V, 301/9 R, 9 DN, 9 DP, 79, 80, 84, 85, 105 R, 105 B; 188/264 R, 18 R, 18 A; 74/230.4

[56] References Cited

U.S. PATENT DOCUMENTS

| 2,123,120 | 7/1938 | Zerk | 301/9 DP |
| 3,749,450 | 7/1973 | Seuter et al. | 301/9 DN |

FOREIGN PATENT DOCUMENTS 387117  2/1933  United Kingdom ............... 301/9 DN Primary Examiner—H. Grant Skaggs
Attorney, Agent, or Firm—Kurt Kelman

[57] ABSTRACT

The wheel comprises a hub having a periphery provided with peripherally spaced, radially projecting lugs. An integral wheel body comprises a central ring which surrounds the hub and is secured to the lugs, and spokes radiating from the ring. The hub and ring define air flow passages disposed radially between the hub and ring.

3 Claims, 4 Drawing Figures

ROAD WHEEL FOR MOTORCYCLES

This invention relates to a wheel for motorcycles, comprising a hub, a plurality of spokes, with stiffened longitiduinal edges, and a rim.

Most motorcycle wheels have been manufactured in one piece from light alloy as a pressure die casting. Whereas wheels of higher quality could be produced if the casting operation were performed under low pressure, this practice would not be economical. Another disadvantage is due to the fact that a sprocket for the drive chain must be secured to the rear wheel so that the latter must differ in shape from the front wheel and invclves higher costs of manufacture. It would be desirable to make the hub, on the one hand, and the spokes and rim, on the other hand, from different materials so that the different properties of the materials, such as higher strength, lower weight, better machining or shaping properties, can be utilized to greater advantage. This is not possible when the wheel is made in one piece. It is also known to use cast spokes or sheet steel spokes and to join such spokes by rivets or screws to a rim of sheet steel or light alloy. Whereas this practice enables the use of different materials for various parts, the structure is relatively complicated and has a reduced stiffness and involves higher assembling costs. Finally, it is known to connect a hub, which constitutes a brake drum, by screws to a wheel disc, which is integral with the rim and which may have apertures which simulate the presence of spokes in appearance. Most of these motorcycle wheels are intended for motor cars and the wheels are centered by means of wheel nuts and secured only to the end face of the brake drum.

It is an object of the invention to eliminate the disadvantages which have been pointed out and to provide a motorcycle wheel which is relatively simple in design and enables a choice of optimum materials for the hub, on the one hand, and the spokes and rim, on the other hand, and also enables the use of identical parts for front and rear wheels so that a higher economy can be achieved in the manufacture.

This object is accomplished according to the invention in that the spokes are integral at one end with the rim and at the other end with a central ring secured to lugs on the periphery of the hub, and openings for the passage of air are provided radially between the ring and the hub.

The motorcycle wheel according to the invention consists of two parts, namely, a hub and a wheel body, which comprises the rim, spokes and a central ring and which may be made from a material quite different from that of the hub. Being a relatively small part, the hub can be economically cast under a relatively low pressure so that the quality of the hub can be improved. Only the hubs of a front wheel and a rear wheel are different, the remaining wheel body is the same for wheels of both kinds and for this reason can be manufactured much more easily. Because the wheel consists of two parts, the heat flow from the hub, which serves also a brake drum, to the remaining wheel body is inhibited. The hub is favorably cooled also owing to the presence of the air passage openings between the ring and hub. In case of damage to the rim, it is sufficient to replace the wheel body. Such replacement is much less expensive than a replacement of the entire wheel, inclusive of the hub and brake drum. Because the hub, which is used to mount the wheel and as a brake drum, is structurally and thermally separate from the remaining body of the wheel, the wheel body may be made from a suitable plastics material so that the weight and costs of the wheel are reduced and the need for a paint finish or for protection against corrosion is eliminated.

The wheel body consisting of the rim, the spokes and the central ring may be centered on the lugs on the periphery of the hub, and the central ring may be provided adjacent to the lugs with inwardly directed lugs so that it is sufficient to machine a smaller surface area and large openings for the passage of air are provided. Alternatively, the periphery of the hub may be conical and may be provided with radial ribs on which the ring is centered. Passages for a flow of air are defined between the ribs. The inclined ribs extending along the conical periphery of the hub exert a pumping action which results in an enforced flow of air through the passages and in an improved cooling of the hub.

In a preferred embodiment of the invention, the ring is secured to the lugs by fixing screws which extend through bores provided in the ring adjacent to the inner ends of adjacent spokes, the spokes have longitudinal edge stiffening portions, and adjacent stiffening portions of adjacent spokes are substantially longitudinally aligned with the bores provided in the ring between these spokes. In such an arrangement, the spokes act virtually as tension and compression members and the forces exerted during the propulsion and braking are directly transmitted by the edge stiffening portions of the spokes to the fixing screws on the hub so that the central ring remains substantially unstressed.

Figure 2:
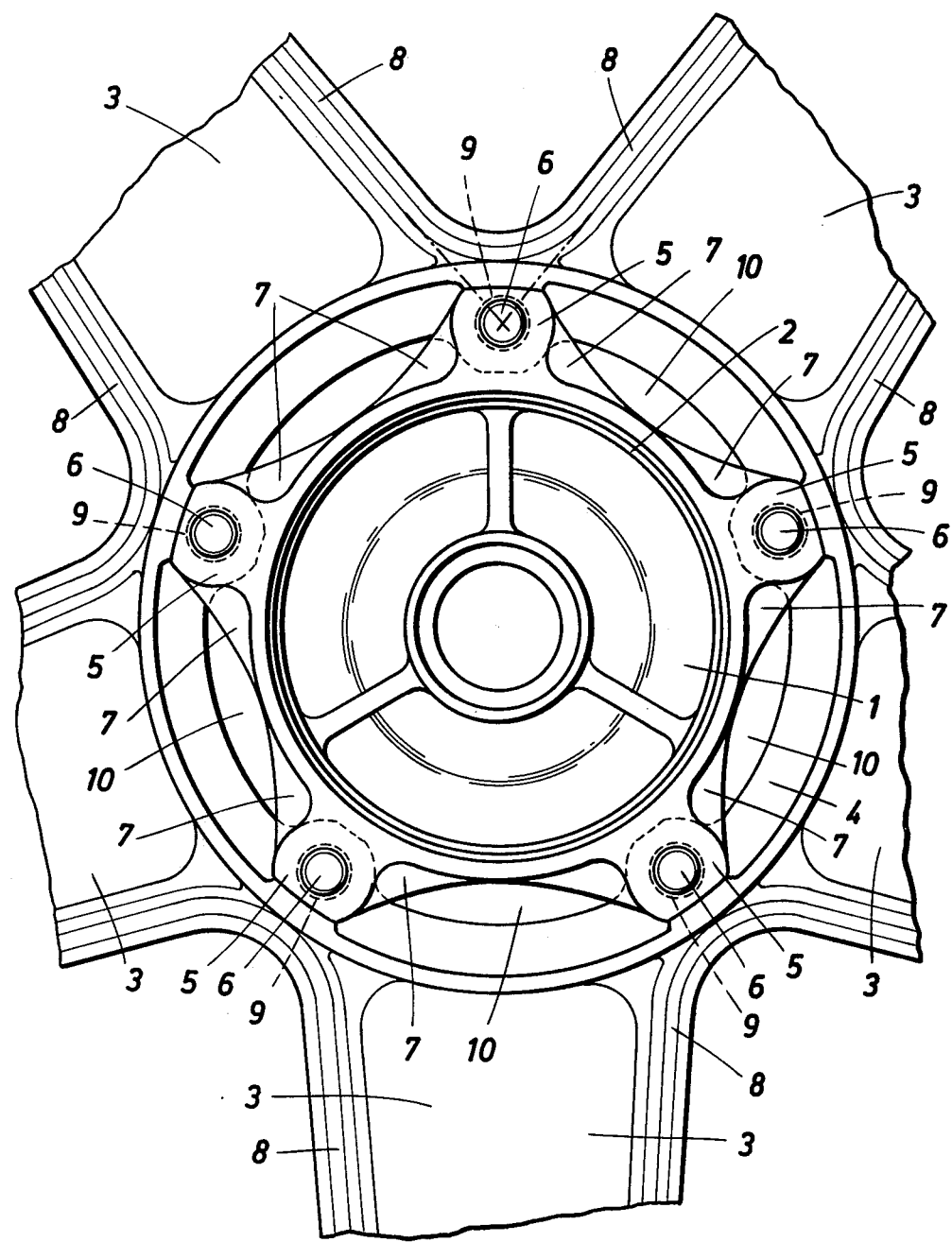
Figure 3:
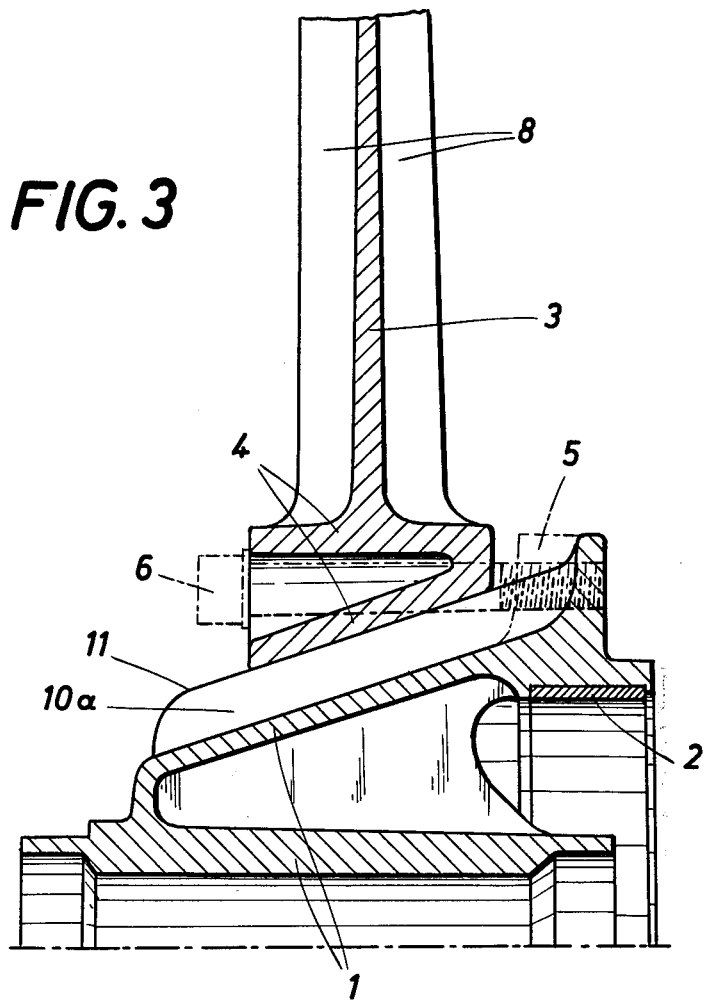
Figure 4:
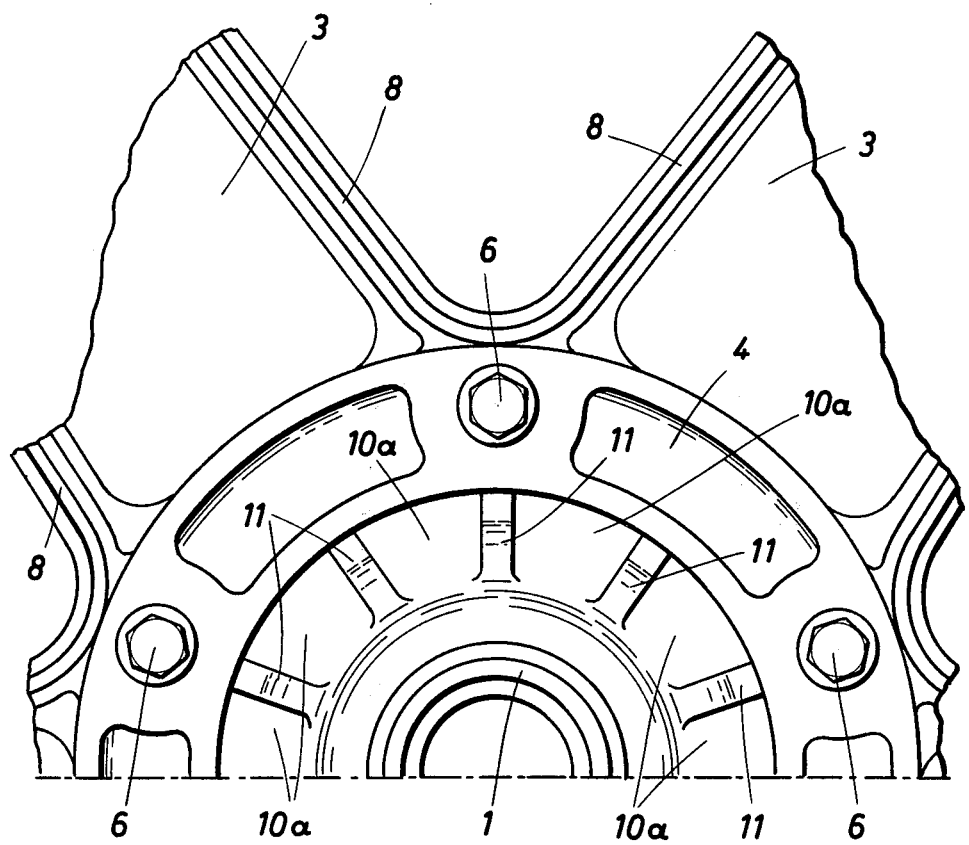

Embodiments of the invention are shown by way of example in the accompanying drawing, in which FIG. 1 is a fragmentary axial sectional view showing a portion of a front wheel for a motorcycle, FIG. 2 is a fragmentary side elevational view of the wheel of FIG. 1, FIG. 3 is a view similar to FIG. 1 and illustrates a modification, and:

FIG. 4 is a view similar to FIG. 2 and illustrates the modification of FIG. 3.

The motorcycle wheel according to the invention consists of two parts, namely, the hub 1, which is integrally cast with a brake ring 2, and an integral wheel body, which consists of the spokes 3, a rim, not shown, and a central ring 4.

The hub is provided at its periphery with lugs 5, to which the central ring 4 is secured by means of screws 6 and is centered, as shown in FIGS. 1 and 2. Lugs 5 are stiffened by peripheral ribs 7.

The spokes 3 have stiffening portions 8 extending along their longitudinal and projecting from the opposite faces of the spokes. As shown in dash-dotted lines in FIG. 2, the imaginery extensions of the adjacent stiffening portions of adjacent spokes 3 intersect in axial bores 9 defined in the ring 4 adjacent to the inner ends of adjacent spokes 3. Fixing screws 6 extend through the bores 9 and are screwed into the lugs 5. Openings 10 for the flow of air are left radially between the ring 4 and the hub 1.

The embodiments shown in FIGS. 1 and 2 differs from the embodiment of FIGS. 3 and 4 in that the peripheriphery of the hub 1 is conical and provided with inclined ribs 11, which present conical radially outside surfaces, on which the ring 4 is centered. Passages 10a for the flow of air are left between the ribs 11. The inclined ribs enforce a flow of air through these passages.

What is claimed is:

1. A motorcycle wheel comprising
(a) a hub having a periphery, the hub including
  (1) peripherally spaced, radially outwardly extending lugs along the periphery of the hub, the lugs defining bores,
(b) an integral wheel body including
  (1) a central ring surrounding the periphery of the hub, the central ring and the hub periphery defining air flow passages disposed radially between the central ring and the periphery of the hub, and
  (2) a plurality of spokes radiating from the central ring, respective ones of the lugs being disposed between adjacent ones of the spokes, and each spoke having two stiffened longitudinal edge portions, imaginary longitudinal extensions of adjacent ones of the stiffened edge portions of the adjacent spokes intersecting in the bores of the lugs disposed therebetween, and
(c) fastening elements extending through the bores and affixing the central ring of the wheel body to the hub.

2. The motorcycle wheel of claim 1, wherein the periphery of the hub is conical and further comprising a plurality of peripherally spaced radial ribs projecting from the conical periphery of the hub, the ribs having outer surfaces defining an imaginary cone, and the central ring having an inner surface defining said cone and engaging the outer surfaces of the ribs.

3. The motorcycle wheel of claim 1, wherein the central ring defines bores aligned with respective ones of the bores in the lugs, and the fastening elements are screws extending through the bores in the central ring and screwed into the bores in the lugs.

* * * * *